US010484309B2

(12) United States Patent
Li et al.

(10) Patent No.: US 10,484,309 B2
(45) Date of Patent: Nov. 19, 2019

(54) CHANNEL ACCESS BASED ON UPLINK VIRTUAL QUEUES

(71) Applicant: Apple Inc., Cupertino, CA (US)

(72) Inventors: Guoqing Li, Campbell, CA (US); Yoel Boger, Shoham (IL); Christiaan A. Hartman, San Jose, CA (US); Yong Liu, Campbell, CA (US); Oren Shani, Saratoga, CA (US); Maksim Shmukler, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/610,046

(22) Filed: May 31, 2017

(65) Prior Publication Data
US 2017/0347372 A1 Nov. 30, 2017

Related U.S. Application Data

(60) Provisional application No. 62/352,875, filed on Jun. 21, 2016, provisional application No. 62/343,765, filed on May 31, 2016.

(51) Int. Cl.
H04L 12/861 (2013.01)
H04W 28/02 (2009.01)
H04W 72/12 (2009.01)
H04W 84/12 (2009.01)
H04L 5/00 (2006.01)
H04W 74/00 (2009.01)

(52) U.S. Cl.
CPC ......... *H04L 49/90* (2013.01); *H04W 28/0278* (2013.01); *H04W 72/1284* (2013.01); *H04L 5/0058* (2013.01); *H04W 74/006* (2013.01); *H04W 84/12* (2013.01)

(58) Field of Classification Search
CPC ............. H04L 49/90; H04W 28/0278; H04W 72/1284
See application file for complete search history.

(56) References Cited

U.S. PATENT DOCUMENTS

2009/0196177 A1* 6/2009 Teyeb ........................ 370/231
2017/0262364 A1* 9/2017 Liden ................. G06F 12/0269
2018/0035443 A1* 2/2018 Koskinen .......... H04W 72/1205

FOREIGN PATENT DOCUMENTS

WO    WO 2016/204538    * 12/2016    ........... H04L 12/873

* cited by examiner

*Primary Examiner* — Ronald B Abelson
(74) *Attorney, Agent, or Firm* — Dickinson Wright RLLP

(57) ABSTRACT

An access point may receive, from a set of electronic devices, one or more buffer status reports that indicate that at least a subset of the electronic devices have uplink data associated with one or more access categories. In response, the access point may create a group of uplink virtual queues for one or more electronic devices in the subset based on the one or more buffer status reports, where a given uplink virtual queue corresponds to a particular access category and a given electronic device. The access point may start one or more backoff counters with a one-to-one correspondence to uplink virtual queues in the group of uplink virtual queues. When a backoff counter for the given uplink virtual queue reaches zero, the access point may transmit a trigger frame to an electronic device in the subset that corresponds to the given uplink virtual queue.

20 Claims, 9 Drawing Sheets

CHANNEL ACCESS BASED ON UPLINK VIRTUAL QUEUES

CROSS-REFERENCE TO RELATED APPLICATIONS

This application claims the benefit of U.S. Provisional Application No. 62/343,765, entitled "CHANNEL ACCESS BASED ON UPLINK VIRTUAL QUEUES," filed May 31, 2016, and U.S. Provisional Application No. 62/352,875, entitled "CHANNEL ACCESS BASED ON UPLINK VIRTUAL QUEUES," filed Jun. 21, 2016, the content of each of which is incorporated herein by reference in its entirety for all purposes.

FIELD

The described embodiments relate, generally, to wireless communications among electronic devices in a wireless local area network (WLAN), including electronic devices and access points, and techniques for controlling channel access by transmitting trigger frames from an access point to the electronic devices based on uplink virtual queues.

BACKGROUND

Many wireless local area networks (WLANs), such as those based on a communication protocol that is compatible with an IEEE 802.11 standard (which is sometimes referred to as 'Wi-Fi'), involve contention-based distributed access systems. For example, Wi-Fi often uses single-user transmission via enhanced distributed channel access or EDCA. In particular, the WLANs are usually contention based because they typically utilize unlicensed frequency bands or spectra, which are unpredictable and are often subject to interference. The unpredictability of the interference can make coordination across multiple electronic devices (which are sometimes referred to as 'stations' or STAs) very challenging (especially for an unmanaged WLAN), and can result in the failure of a collision free period (CFP). However, the use of fully distributed channel access can allow a very simpler access point (AP) and a simpler network deployment (relative to a cellular network), which can make it easier and cheaper to deploy a WLAN.

Recently, contention-free multi-user transmission in uplink has been proposed in the IEEE 802.11ax standard. This approach can dramatically change how an electronic device accesses the communication medium. In particular, an electronic device can transmit without contending for the communication medium. Instead, an access point may content the communication medium for the electronic device, and may grant transmission opportunities to the electronic device using a trigger frame (which is sometimes referred to as 'trigger-based access' or 'trigger-based channel access,' e.g., uplink multi-user transmission). For example, during trigger-based uplink channel access, an access point may sense the communication medium and, as needed, perform backoff on behalf of potential uplink trigger-access-enabled electronic devices. Then, the access point may send a trigger frame with multi-user allocation information for the electronic devices. In response to the trigger frame, the electronic devices may send uplink traffic in the allocated-resource units in a synchronized manner in a multi-user transmission.

In principle, the use of trigger-based access and multi-user transmission can significantly reduce the contention by the electronic devices in the WLAN. Consequently, trigger-based access is often expected to result in improved communication performance. However, in order for the electronic devices in the WLAN to take advantage of uplink multi-user transmission, the access point usually needs to send out a trigger frame in a timely manner. If, e.g., because of congestion in the WLAN, this does not occur, then the electronic devices may only be able to use single-user transmission and the communication performance may not be improved.

SUMMARY

Some embodiments that relate to an access point that transmits a trigger frame to a set of electronic devices in a WLAN are described. In particular, during operation, an interface circuit in the access point may receive, from the set of electronic devices, one or more buffer status reports that indicate that at least a subset of the set of electronic devices have uplink data, where the uplink data are associated with one or more access categories. In response, the access point may create a group of uplink virtual queues for electronic devices in the subset based on the one or more buffer status reports, where a given uplink virtual queue corresponds to a particular access category for which there is pending uplink data at a given electronic device. Then, the access point may start one or more backoff counters with a one-to-one correspondence to uplink virtual queues in the group of uplink virtual queues. When a given backoff counter for the given uplink virtual queue reaches a predefined count value, the access point may transmit the trigger frame to an electronic device in the subset that corresponds to the given uplink virtual queue.

Note that the trigger frame may include information specifying allocated resource units for the electronic device.

Moreover, the predefined count value may be zero.

Furthermore, the access point may receive a multi-user frame transmission from the electronic device in response to the trigger frame.

Additionally, the access point may be compatible with an Institute of Electrical and Electronics Engineers (IEEE) standard that includes trigger-based channel access. For example, the IEEE 802.11 standard may include IEEE 802.11ax.

In some embodiments, a contention window used in the one or more backoff counters is the same as that used by one or more other access points in the WLAN that are compatible with the IEEE 802.11 standard. However, the contention window may be smaller than those used by the set of electronic devices or one or more legacy access points in the WLAN that are not compatible with the IEEE 802.11 standard (i.e., that do not use trigger-based channel access).

Note that the contention window may be based on a number of the other access points in the WLAN that are compatible with the IEEE 802.11 standard. For example, the contention window may increase as a number of the other access points in the WLAN increases.

Moreover, after the uplink data from the electronic device has been cleared, the access point may remove one or more corresponding uplink virtual queues in the group of uplink virtual queues.

Furthermore, the access point may remove a given uplink virtual queue after a time interval has elapsed since the given uplink virtual queue was created.

Additionally, when the access point initiates a cascaded operation (in which a single backoff occurs at the beginning of the cascaded operation, followed by downlink, uplink and block acknowledgment operations), the access point may have an increased priority for accessing a channel. This increased priority may be achieved by increasing a number of backoff counters for the access point, such that, when any of these backoff counters reaches the predefined count value (such as zero), the access point may access the channel. Note that this operation may be performed in conjunction with or separately from the aforementioned operations.

In some embodiments, the access point provides a request, during a target wake time (TWT) negotiation, to disable transmissions by a counterparty (such as the electronic device) or the access point during a TWT window. This request may be provided by setting a bit or a value in a field in a management frame (such as a TWT request or a TWT response). Moreover, if there a common TWT negotiation for uplink and downlink traffic, the access point may receive from the counterparty (such as the electronic device) a request that the access point or the electronic device disable transmissions during the TWT window. This request may be provided by setting another bit or a value in a field in a management frame (such as the TWT request or the TWT response). Note that this operation may be performed in conjunction with or separately from the aforementioned operations.

Other embodiments include operation with or by the electronic device.

Other embodiments provide an interface circuit in the access point or the electronic device.

Other embodiments provide a computer-program product for use with the interface circuit in the access point and/or the electronic device. This computer-program product includes instructions for at least some of the aforementioned operations performed by the interface circuit in the access point or the electronic device.

Other embodiments provide a method for transmitting a trigger frame. The method includes at least some of the aforementioned operations performed by the interface circuit in the access point or the electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
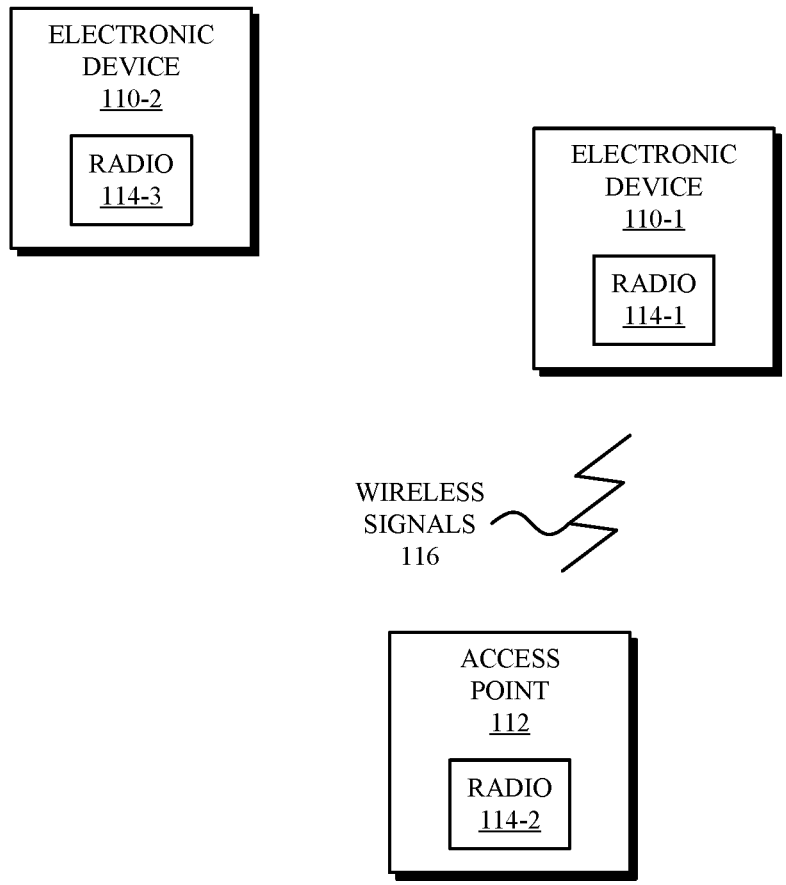
FIG. 1 is a block diagram illustrating an example of electronic devices communicating wirelessly.

An access point may receive, from a set of electronic devices in a WLAN, one or more buffer status reports that indicate that at least a subset of the set of electronic devices have uplink data having one or more associated access categories. In response, the access point may create a group of uplink virtual queues for electronic devices in the subset based on the one or more buffer status reports, where a given uplink virtual queue corresponds to a particular access category for which there is pending uplink data at a given electronic device. Then, the access point may start one or more backoff counters with a one-to-one correspondence to uplink virtual queues in the group of uplink virtual queues. When a given backoff counter for the given uplink virtual queue reaches a predefined value (such as zero), the access point may transmit a trigger frame to an electronic device in the subset that corresponds to the given uplink virtual queue.

By selectively winning the channel on behalf of the electronic devices in the subset, this communication technique may help ensure timely (or efficient) and fair access to the channel by the subset of the electronic devices that have uplink data. In the process, the communication technique may reduce contention in the WLAN by facilitating trigger-based channel access and improved communication performance in the WLAN. Consequently, the communication technique may improve the user experience when using the access point or the electronic device, and thus may increase customer satisfaction and retention.

Note that the communication technique may be used during wireless communication between electronic devices in accordance with a communication protocol, such as: an IEEE 802.11 standard (which is sometimes referred to as Wi-Fi). For example, the communication technique may be used with IEEE 802.11ax, which is used as an illustrative example in the discussion that follows. However, this communication technique may also be used with a wide variety of other communication protocols, and in access points and electronic devices (such as portable electronic devices or mobile devices) that can incorporate multiple different radio access technologies (RATs) to provide connections through different wireless networks that offer different services and/or capabilities.

In particular, an electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution (LTE), LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations, client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or user equipment (UE) can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

We now describe the communication technique. FIG. 1 presents a block diagram illustrating an example of electronic devices communicating wirelessly. In particular, one or more electronic devices 110 (such as a smartphone, a laptop computer, a notebook computer, a tablet, or another such electronic device, which is sometimes referred to as a 'primary electronic device') and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device.

As described further below with reference to FIG. 9, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112 to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. For example, one or more of electronic devices 110 may transmit one or more frames to access point 112 that include one or more buffer status reports that indicate that at least a subset of electronic devices 110 have uplink data, where the uplink data are associated with one or more access categories or priorities (such as voice, video, best effort, background, etc.). As illustrated further below with reference to FIGS. 2-4, in response access point 112 may create a group of uplink virtual queues for electronic devices in the subset based on the one or more buffer status reports. Note that a given uplink virtual queue may correspond to a particular access category for which there is pending uplink data at a given electronic device.

Then, access point 112 may start one or more backoff counters with a one-to-one correspondence to uplink virtual queues in the group of uplink virtual queues. When a given backoff counter for the given uplink virtual queue reaches a predefined count value (such as zero), access point 112 may transmit a trigger frame to an electronic device (such as electronic device 110-1) in the subset that corresponds to the given uplink virtual queue. Furthermore, access point 112 may receive a multi-user frame transmission from electronic device 110-1 in response to the trigger frame.

Note that access point 112 may remove a given uplink virtual queue after a time interval has elapsed since the given uplink virtual queue was created or since a buffer status report indicated that there was no longer pending uplink data in a corresponding access category at a given electronic device. For example, a given uplink virtual queue may be removed after 1-2 s.

Figure 5:
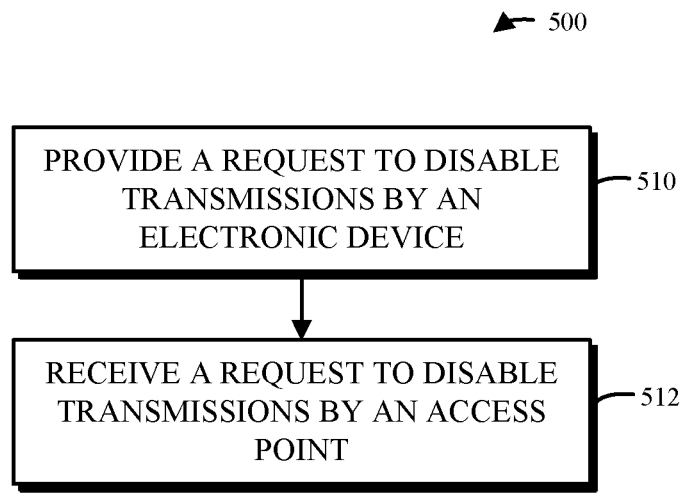
FIG. 5 is a flow diagram illustrating an example of a method for disabling transmissions using one of the electronic devices in FIG. 1.

Moreover, as described further below with reference to FIGS. 5 and 6, independently or additionally from one or more of the preceding operations, access point 112 may provide a request, during a TWT negotiation with one of electronic devices 110 (such as electronic device 110-1), to disable transmissions by a counterparty (i.e., electronic device 110-1) or to disable its own transmissions (i.e., by access point 112) during a TWT window. This request may be provided by setting a bit or a value in a field in a management frame (such as a TWT request or a TWT response). Furthermore, if there a common TWT negotiation for uplink and downlink traffic, access point 112 may receive from the counterparty (such as electronic device 110-1) a request that access point 112 or electronic device 110-1 disable transmissions during the TWT window. This request may be provided by setting another bit or a value in a field in a management frame (such as the TWT request or the TWT response).

As described further below with reference to FIGS. 7 and 8, independently or additionally from one or more of the preceding operations, when access point 112 initiates a cascaded operation (in which a single backoff occurs at the beginning of the cascaded operation, followed by downlink, uplink and block acknowledgment operations), access point 112 may have an increased priority for accessing a channel. This increased priority may be achieved by increasing a number of backoff counters for access point 112, such that, when any of these backoff counters reaches the predefined count value (such as zero), access point 112 may access the channel.

In these ways, the communication technique may allow electronic devices 110 and access point 112 to reduce contention in the WLAN and to improve communication performance. These capabilities may improve the user experience when using electronic devices 110.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include: a received signal strength (RSS), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
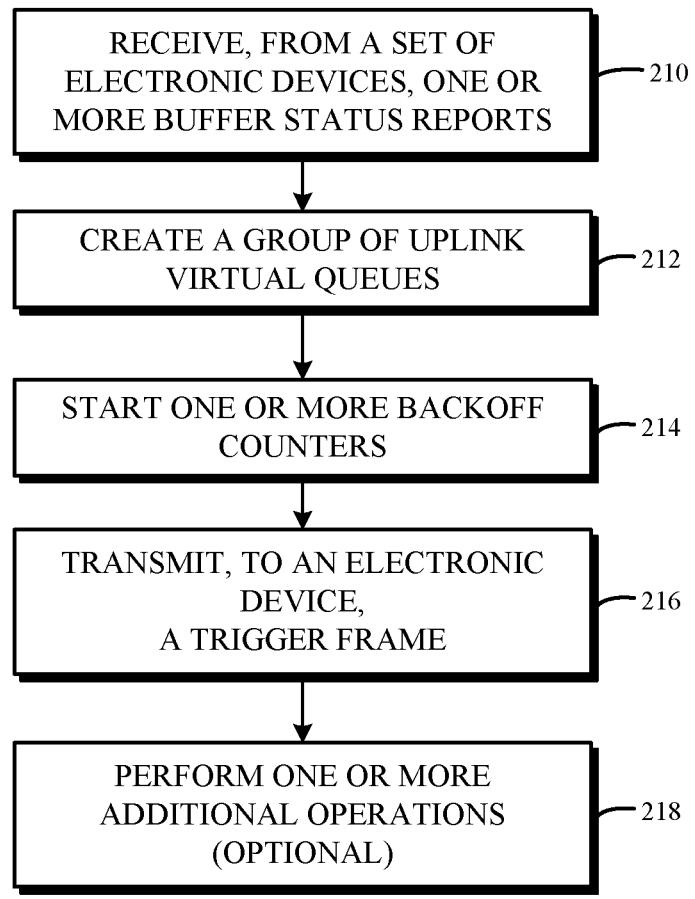
FIG. 2 is a flow diagram illustrating an example of a method for transmitting a trigger frame using one of the electronic devices in FIG. 1.

FIG. 2 presents a flow diagram illustrating an example method 200 for transmitting a trigger frame in accordance with some embodiments. This method may be performed by an access point (and, more generally, an electronic device), such as using an interface circuit in access point 112 in FIG. 1. During operation, the access point receives, from a set of electronic devices (which may include one or more electronic devices), one or more buffer status reports (operation 210) that indicate that at least a subset of the set of electronic devices have uplink data, where the uplink data are associated with one or more access categories. Note that the access point may be compatible with an IEEE standard that includes trigger-based channel access. For example, the IEEE 802.11 standard may include IEEE 802.11ax.

In response, the access point may create a group of uplink virtual queues (operation 212) for electronic devices in the subset based on the one or more buffer status reports, where a given uplink virtual queue corresponds to a particular access category for which there is pending uplink data at a given electronic device. Note that the group may include one or more uplink virtual queues.

The access point may start one or more backoff counters (operation 214) with a one-to-one correspondence to uplink virtual queues in the group of uplink virtual queues. In some embodiments, a contention window used in the one or more backoff counters is the same as that used by one or more other access points in the WLAN that are compatible with the IEEE 802.11 standard. Moreover, the contention window may be based on a number of the other access points in the WLAN that are compatible with the IEEE 802.11 standard. For example, the contention window may increase as a number of the other access points in the WLAN increases. Furthermore, the contention window may be smaller than those used by the set of electronic devices or one or more legacy access points in the WLAN that are not compatible with the IEEE 802.11 standard (i.e., that do not use trigger-based channel access).

When a given backoff counter for the given uplink virtual queue reaches a predefined count value (such as zero, which is used as an illustration), the access point may transmit the trigger frame (operation 216) to an electronic device in the subset that corresponds to the given uplink virtual queue. Note that the trigger frame may include information specifying allocated resource units for the electronic device.

In some embodiments, the access point optionally performs one or more additional operations (operation 218). For example, the access point may optionally receive a multi-user frame transmission from the electronic device in response to the trigger frame. Alternatively or additionally, after the uplink data from the electronic device has been cleared, the access point may remove one or more corresponding uplink virtual queues in the group of uplink virtual queues. Moreover, the access point may remove a given uplink virtual queue after a time interval has elapsed since the given uplink virtual queue was created or since there was uplink data at the given electronic device for the corresponding access category. Furthermore, the access point may disable transmission by one or more of the set of electronic devices during the TWT window and/or, during a cascaded operation, may increase its channel-access priority.

In some embodiments of method 200, there may be additional or fewer operations. Moreover, the order of the operations may be changed, and/or two or more operations may be combined into a single operation or performed such that they overlap in time.

In some embodiments, at least some of the operations in method 200 are performed by interface circuits in the access point or the electronic device. For example, at least some of the operations may be performed by firmware executed by an interface circuit, such as firmware associated with a MAC layer, as well as one or more circuits in a physical layer in the interface circuit.

Figure 3:
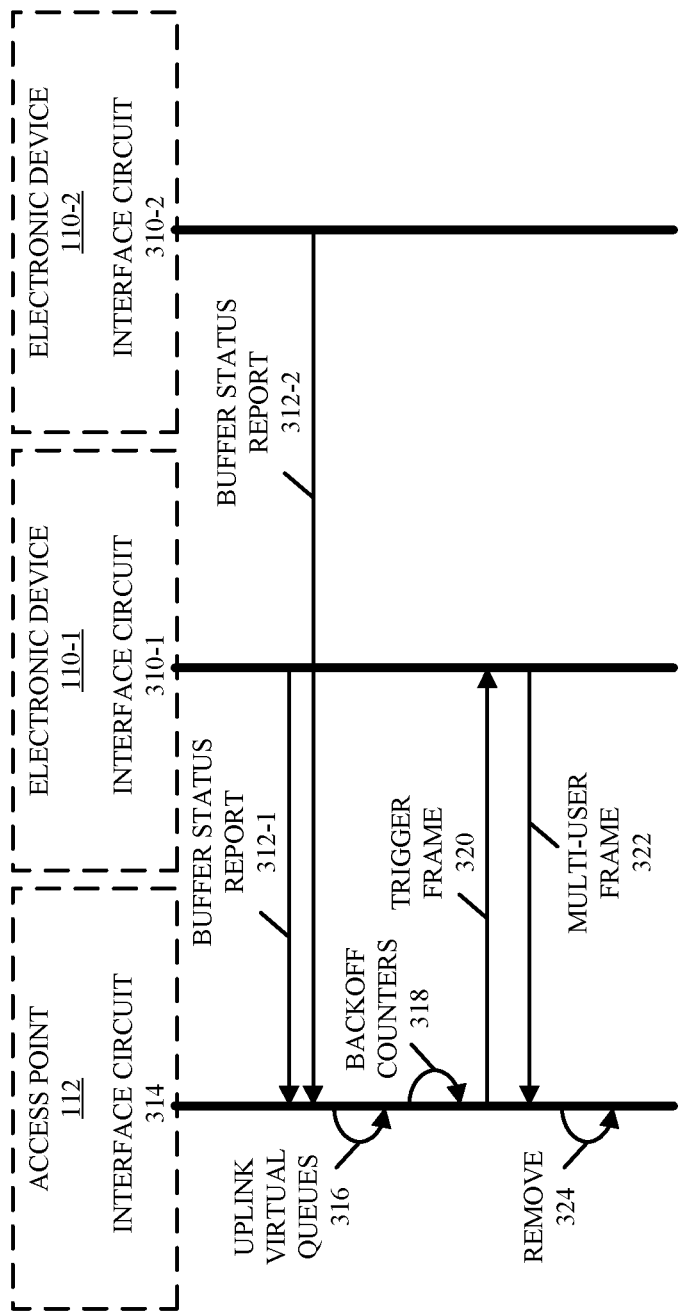
FIG. 3 is a flow diagram illustrating an example of communication between electronic devices, such as the electronic devices of FIG. 1.

The communication techniques are further illustrated in FIG. 3, which presents a flow diagram illustrating an example of communication between electronic devices 110 and access point 112. In particular, interface circuits 310 in electronic devices 110 may transmit one or more buffer status reports 312 that indicate that at least a subset of electronic devices 110 have uplink data, where the uplink data are associated with one or more access categories.

In response, an interface circuit 314 in access point 112 may create a group of uplink virtual queues 316 for electronic devices in the subset based on the one or more buffer status reports 312, where a given uplink virtual queue corresponds to a particular access category for which there is pending uplink data at a given electronic device.

Then, access point 112 may start one or more backoff counters 318 with a one-to-one correspondence to uplink virtual queues in the group of uplink virtual queues 316.

When a given backoff counter for the given uplink virtual queue reaches zero (which is used as an illustration), access point 112 may transmit a trigger frame 320 to an electronic device (such as electronic device 110-1) in the subset that corresponds to the given uplink virtual queue.

In some embodiments, access point 112 optionally receives a multi-user frame 322 transmission from electronic device 110-1 in response to trigger frame 320. Alternatively or additionally, after the uplink data from electronic device 110-1 has been cleared, access point 112 may remove 324 one or more corresponding uplink virtual queues in the group of uplink virtual queues 316. Alternatively or additionally, access point 112 may remove 324 one or more of uplink virtual queue 316 after a time interval has elapsed since the given uplink virtual queue was created or since there was uplink data pending at electronic devices 110-1 and/or 110-2.

We now describe embodiments of the communication technique. In existing contention-based channel access techniques (such as EDCA), at a particular electronic device in a WLAN there may be four access queues and backoff counters, each corresponding to a different access category (such as voice, video, best effort and background). When a particular backoff counter reaches zero, the electronic device may win the channel and can initiate single-user transmission.

In contrast, in uplink multi-user transmission, because an access point initiates the transmission by the electronic devices, the access point is actually contending for the channel on behalf of the electronic devices. The disclosed communication technique provides a trigger-based channel-access technique for an access point to send a trigger frame.

Figure 4:
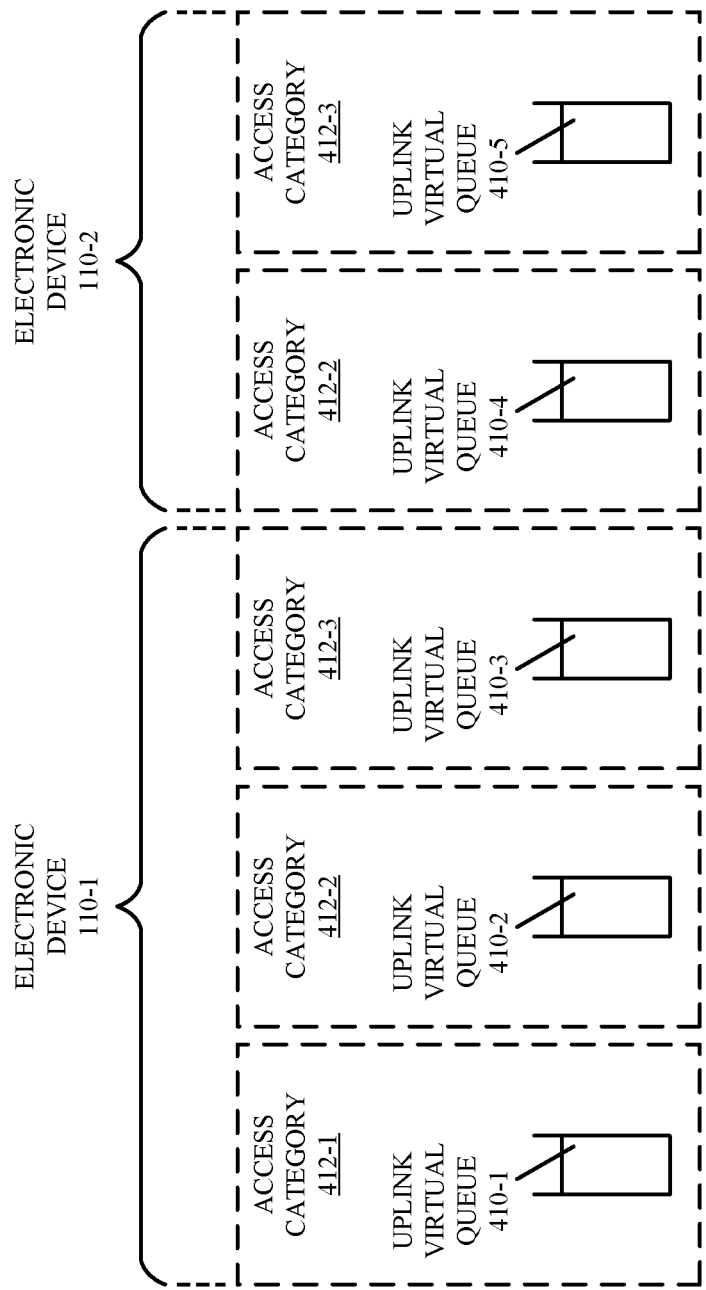
FIG. 4 is a drawing illustrating uplink virtual queues associated with access categories and the electronic devices in FIG. 1.

In particular, the access point may create virtual queues (which are sometimes referred to as 'uplink virtual queues') for uplink electronic devices that have uplink data traffic. These uplink virtual queues may be based on one or more buffer status reports from the electronic devices. Moreover, the access point may create the uplink virtual queues for the corresponding access categories that have reported data traffic from the electronic devices. For example, if electronic device 1 has reported data traffic for access categories 1, 2 and 4, corresponding uplink virtual queues may be created by the access point. FIG. 4 presents a drawing illustrating an example of uplink virtual queues 410 associated with access categories 412 and electronic devices 110 (FIG. 1). Moreover, for each of the uplink virtual queues, the access point may start a backoff counter. When any of the backoff counters reaches zero, the access point may win the channel on behalf of the corresponding electronic device and may transmit a trigger frame to one or more of the electronic devices.

Because the access point may only contend for the channel for those electronic devices that have uplink data traffic, the uplink virtual queues and the backoff counters may be created on behalf of these electronic devices. When a particular backoff counter (such as a backoff counter for uplink virtual queue 410-1) reaches zero, that particular electronic device and that particular access category (i.e., access category 412-1 in this example) may be considered to have won the channel. When the access point sends a trigger frame when this backoff counter reaches zero, the trigger frame may include information specifying resource-unit allocation for the particular electronic device and the particular access category to transmit data. Note that the particular electronic device is sometimes called the "primary electronic device" and the particular access category is sometimes called the "primary access category".

The contention window used in each backoff counter may depend on the neighboring IEEE 802.11ax access points in order to avoid collisions with other IEEE 802.11ax access points. Moreover, the contention window may be chosen or selected such that IEEE 802.11ax access points have equal priority in sending a trigger frame. However, an IEEE 802.11ax access point may have higher priority in sending the trigger frame. Note that the use of multiple backoff counter at the access point sides may already create or facilitate such a prioritized access.

Furthermore, IEEE 802.11ax access points may have higher priority than IEEE 802.11ax stations. This may be facilitated by choosing or selecting a contention window for an IEEE 802.11ax access point that is smaller than the contention window that is used by an IEEE 802.11ax electronic device (or station) or by a legacy IEEE 802.11 electronic device for this particular access category. For example, if the video access category has a contention window of 31, then the access point may use a smaller contention window size for video. Similarly, an IEEE 802.11ax access point may have a higher priority than a legacy IEEE 802.11 access point that does not support trigger-based channel access. Thus, the IEEE 802.11ax access point may have a smaller contention window for a particular access category than that used by the legacy IEEE 802.11 access point(s).

Therefore, in general, an IEEE 802.11ax access point may use a contention window that is a function of a number of neighboring IEEE 802.11ax access points, and the contention window may increase as the number of neighboring IEEE 802.11ax access points increases (thereby reducing collisions from multiple access points contending for the channel. In addition, an IEEE 802.11ax access point may use a smaller contention window value than that used by legacy IEEE 802.11 access points and legacy electronic devices.

Note that the communication technique may be fair and effective. In particular, when the number of the electronic devices in a WLAN increases, the probability that the access point will get to access the channel increases. This allows the access point to scale its trigger-frame transmission priority based on the number of electronic devices for which it is attempting to access the channel. Therefore, the more electronic devices the access point needs to contend for, i.e., the more congestion that the access point needs to resolve, the higher the trigger transmission probability. Furthermore, the contention by the access point may be fair by taking other IEEE 802.11ax access points into account. When more access points use high priority to access the channel, the access point may be more conservative and may not reduce collisions by using a very small contention window.

In summary, the communication technique may provide a trigger-based channel access technique for an access point to send a trigger frame. In this trigger-based channel access technique, an access point may create an uplink virtual queue when an electronic device reports a buffer for an access category. Note that the access point may destroy an uplink virtual queue when the data for the electronic device has been cleared. Moreover, the access point may derive a contention-window size that is a function of the number of neighboring IEEE 802.11ax access points. In particular, the more neighboring IEEE 802.11ax access points, the larger the contention window. For example, the contention window for a particular access category may equal a value plus a number of neighboring IEEE 11ax access points.

In some embodiments, different contention-window sizes are used for at least some of the different backoff counters and/or for at least some of the access categories. However, in other embodiments, the same contention-window size is used for at least some of the different backoff counters and/or for at least some of the access categories.

We now describe additional embodiments of the communication technique, which may be performed separately or in conjunction with one or more of the preceding embodiments. FIG. 5 presents a flow diagram illustrating an example method 500 for disabling transmissions in accordance with some embodiments. This method may be performed by an access point (and, more generally, an electronic device), such as an interface circuit in access point 112 in FIG. 1. During operation, the access point may provide a request, during a TWT negotiation, to disable transmissions (operation 510) by an electronic device or the access point during a TWT window. This request may be provided by setting a bit or a value in a field in a management frame (such as a TWT request or a TWT response).

Moreover, if there a common TWT negotiation for uplink and downlink traffic, the access point may receive from electronic device 110-1 a request that the access point or the electronic device disable transmissions (operation 512) during the TWT window. This request may be provided by setting another bit or a value in a field in a management frame (such as the TWT request or the TWT response).

In some embodiments of method 500, there may be additional or fewer operations. Moreover, the order of the operations may be changed, and/or two or more operations may be combined into a single operation.

In some embodiments, at least some of the operations in method 500 are performed by interface circuits in the access point or the electronic device. For example, at least some of the operations may be performed by firmware executed by an interface circuit, such as firmware associated with a MAC layer, as well as one or more circuits in a physical layer in the interface circuit.

Figure 6:
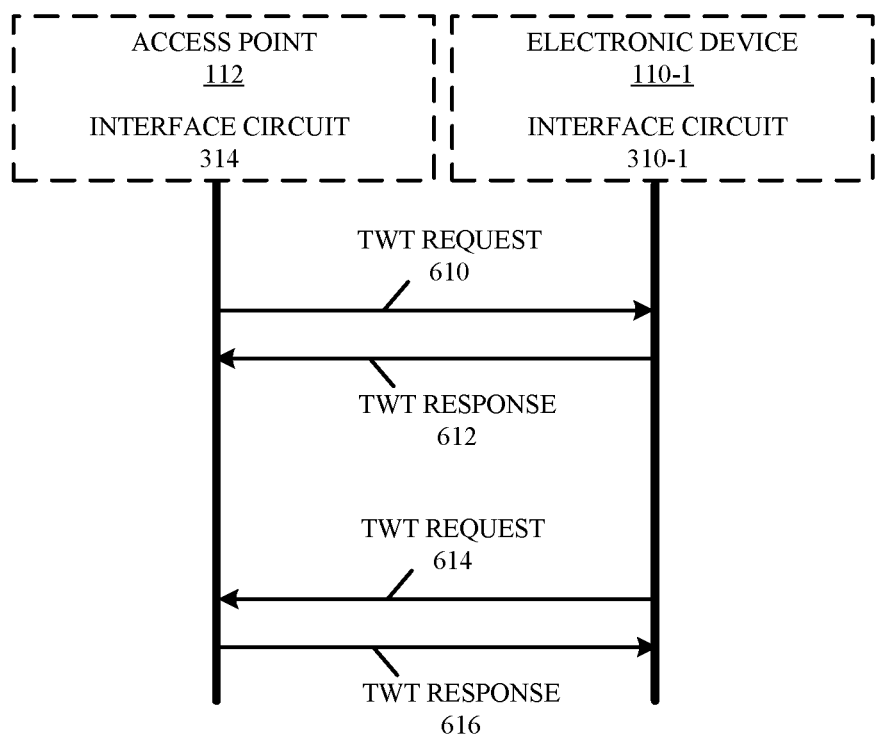
FIG. 6 is a flow diagram illustrating an example of communication between electronic devices, such as the electronic devices of FIG. 1.

The communication techniques are further illustrated in FIG. 6, which presents a flow diagram illustrating an example of communication between electronic device 110-1 and access point 112. In particular, interface circuit 314 in access point 112 may transmit a TWT request 610 (such as a management frame) with a bit included in a field that indicates that access point 112 is requesting, during a TWT negotiation, that electronic device 110-1 disable transmissions during one or more subsequent TWT windows. After interface circuit 310-1 receives TWT request 610, interface circuit 310-1 may transmit a TWT response 612 that agrees to disable transmissions during the one or more subsequent TWT windows.

Alternatively or additionally, if there a common TWT negotiation for uplink and downlink traffic, interface circuit 310-1 may transmit a TWT request 614 with a bit included in a field that indicates that electronic device 110-1 is requesting, during the TWT negotiation, that access point 112 disable transmissions during the one or more subsequent TWT windows. After interface circuit 314 receives TWT request 614, interface circuit 314 may transmit a TWT response 616 that agrees to disable transmissions during the one or more subsequent TWT windows.

Figure 7:
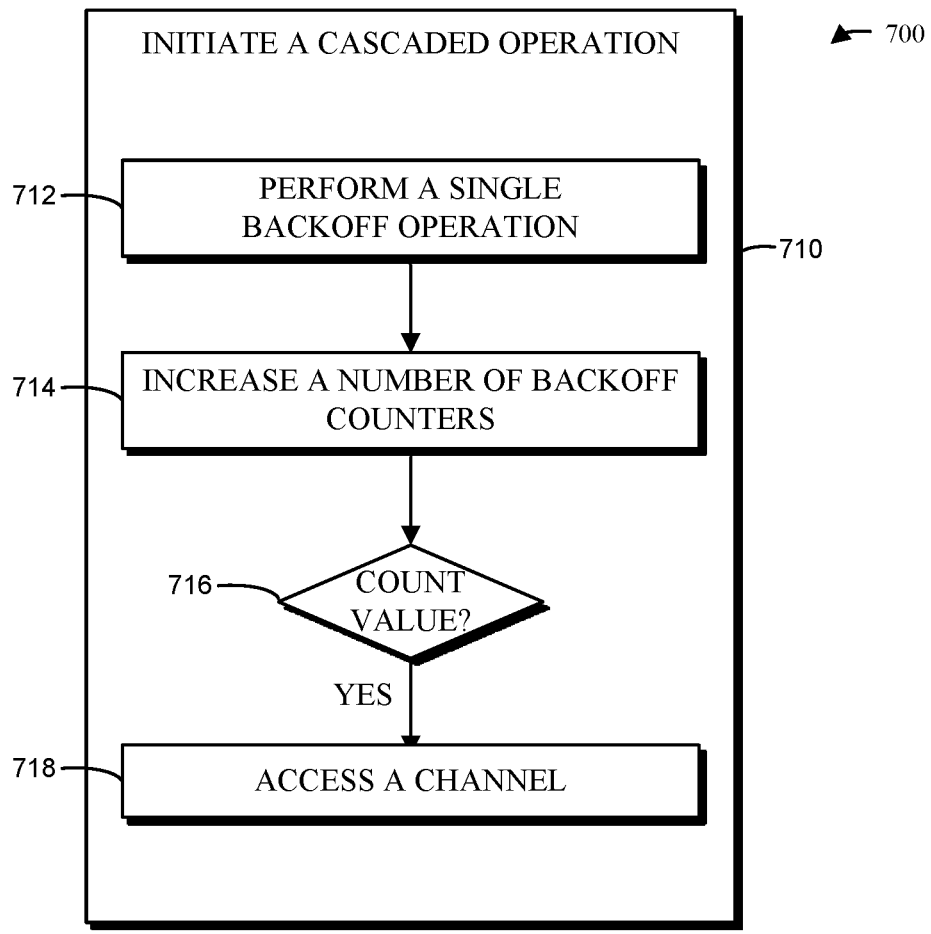
FIG. 7 is a flow diagram illustrating an example of a method for increasing a channel-access priority using one of the electronic devices in FIG. 1.

FIG. 7 presents a flow diagram illustrating an example method 700 for increasing a channel-access priority in accordance with some embodiments. This method may be performed by an access point (and, more generally, an electronic device), such as an interface circuit in access point 112 in FIG. 1. During operation, the access point initiates a cascaded operation (operation 710). In particular, the access point may perform a single backoff operation (operation 712) at a beginning of the cascaded operation. In order to increase a priority for the access point to access a channel during a remainder of the cascaded operation, access point may increase a number of backoff counters (operation 714) or may create additional backoff counters. For example, access point may double a number of backoff counters. When any of these backoff counters reaches a predefined count value (operation 716), the access point may access the channel (operation 718). For example, the access point may transmit downlink data, then the access point may receive uplink data, and the access point may transmit a block acknowledgment. In particular, in some embodiments, the backoff counter is used to provide higher priority channel access for a trigger frame that initiates transmission of the uplink data.

In some embodiments of method 700, there may be additional or fewer operations. Moreover, the order of the operations may be changed, and/or two or more operations may be combined into a single operation.

In some embodiments, at least some of the operations in method 700 are performed by interface circuits in the access point or the electronic device. For example, at least some of the operations may be performed by firmware executed by an interface circuit, such as firmware associated with a MAC layer, as well as one or more circuits in a physical layer in the interface circuit.

Figure 8:
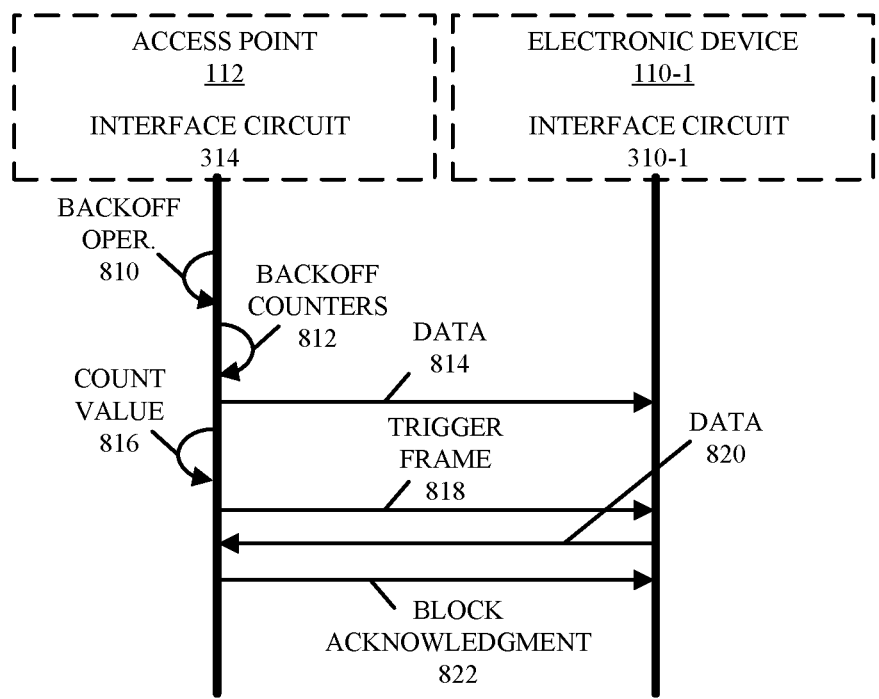
FIG. 8 is a flow diagram illustrating an example of communication between electronic devices, such as the electronic devices of FIG. 1.

The communication techniques are further illustrated in FIG. 8, which presents a flow diagram illustrating an example of communication between electronic device 110-1 and access point 112. In particular, interface circuit 314 may perform a backoff operation 810 in a cascaded operation. In order to increase a priority for access point 112 to access a channel, interface circuit 314 may increase a number of backoff counters 812.

When any of the backoff counters reaches a predefined count value 816 interface circuit 314 may access the channel. For example, interface circuit 314 may transmit data 814 to electronic device 110-1. After the predefined count value 816 is reached, interface circuit 314 may transmit a trigger frame 818 to electronic device 110-1. After receiving trigger frame 818, interface circuit 310-1 may transmit data 820 to access point 112. Furthermore, after data 820 is received, interface circuit 314 may transmit a block acknowledgment 822 to electronic device 110-1, thereby completing the cascaded operation.

We now describe additional embodiments of the communication technique. In some embodiments, there may be additional rules for adding and/or removing virtual uplink queues. The motivation for these rules is so the number of virtual uplink queues is representative of the current traffic load in the WLAN. In addition, it is not desirable for an access point to add virtual uplink queues but to never remove them.

For example, an access point may add a virtual uplink queue once the access point receives uplink traffic on an access category from an electronic device. This virtual uplink queue may be removed based on a timeout. Thus, if there is no uplink traffic from the electronic device/access category pair for a period of time (such as 1-2 s), the access point may remove this virtual uplink queue.

Moreover, in some embodiments, when there is an access-point-initiated cascaded operation, the access point may be given increased priority to access the channel (which is sometimes referred to as a 'channel-access priority'). In particular, during an access-point-initiated cascaded operation, the access point may be: sharing a transmission opportunity of the access point with uplink data from one or more triggered electronic devices; and/or reducing the number of contentions required by only requiring a single backoff at the beginning of the cascaded operation and then allowing downlink, uplink and block acknowledgment transactions or operations. In these embodiments, the access point may have an increased priority (such as an increase of 2×) to obtain the channel access for access-point-initiated cascaded operation.

Furthermore, in some embodiments, transmissions by one or more electronic devices or an access point may be disabled in a subsequent TWT window during a TWT negotiation between the one or more electronic devices and the access point. This disabling of transmissions may be used because the TWT may not work well or may not be very power efficient if, during a negotiated TWT window, the one or more electronic devices wake up for the TWT window, but the access point is not able to obtain the channel access (for example, due to a highly congested channel). In order to address this challenge (by giving the access point higher priority to access the channel to send a trigger frame), the access point may add a bit to a management frame during the TWT negotiation in IEEE 802.11ax of a TWT window that provides the following indication: a '0' may indicate that an electronic device may not initiate transmission inside this TWT window; and a '1' may initiate that the electronic device may transmit inside this TWT window. Note that in order for the electronic device not to transmit during the TWT window, there may need to be agreement between the access point and the electronic device during the TWT negotiation. In some embodiments, the electronic device may indicate that it voluntarily will not transmit during the TWT window. In this case, the electronic device can unilaterally decide not transmit during the TWT window.

In some embodiments, there is a single TWT negotiation for IEEE 802.11ax for both uplink and downlink traffic. This approach may be more power efficient for the electronic device and the access point, and may take into account both traffic patterns (uplink and downlink). In these embodiments, another bit may be included in the management frame for the access point. In particular, a '0' may indicate that the access point is not allowed to initiate transmissions inside the TWT window; and a '1' may indicate that the access point is allowed to initiate transmissions inside the TWT window. Note that in order for the access point not to transmit during the TWT window, there may need to be agreement between the access point and the electronic device during the TWT negotiation. In some embodiments, the access point may indicate that it voluntarily will not transmit during the TWT window. In this case, the access point can unilaterally decide not transmit during the TWT window.

We now describe embodiments of an electronic device. FIG. 9 presents a block diagram of an electronic device 900 (which may be an access point, another electronic device, such as a station or a legacy electronic device) in accordance with some embodiments. This electronic device includes processing subsystem 910, memory subsystem 912, and networking subsystem 914. Processing subsystem 910 includes one or more devices configured to perform computational operations. For example, processing subsystem 910 can include one or more microprocessors, application-specific integrated circuits (ASICs), microcontrollers, programmable-logic devices, and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), a read-only memory (ROM), flash memory, and/or other types of memory. In some embodiments, instructions for processing subsystem 910 in memory subsystem 912 include: one or more program modules or sets of instructions (such as program module 922 or operating system 924), which may be executed by processing subsystem 910. For example, a ROM can store programs, utilities or processes to be executed in a non-volatile manner, and DRAM can provide volatile data storage, and may store instructions related to the operation of electronic device 900. Note that the one or more computer programs may constitute a computer-program mechanism, a computer-readable storage medium or software. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910. In some embodiments, the one or more computer programs are distributed over a network-coupled computer system so that the one or more computer programs are stored and executed in a distributed manner.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Figure 9:
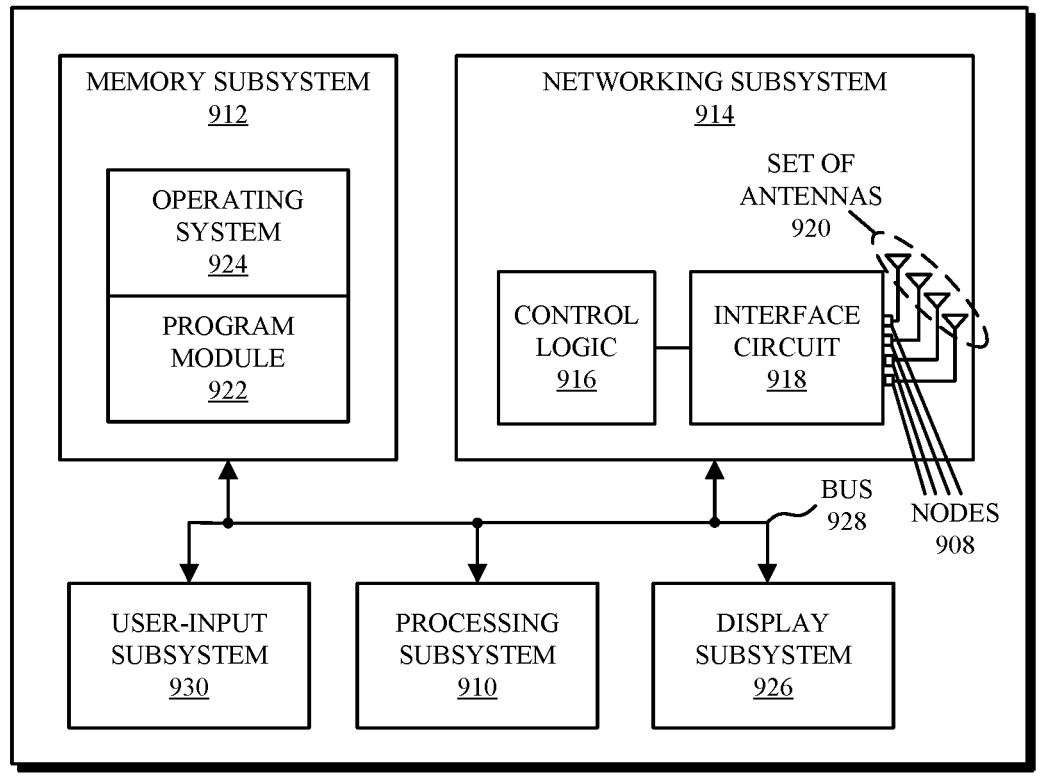
FIG. 9 is a block diagram illustrating an example of one of the electronic devices of FIG. 1.

Networking subsystem 914 includes one or more devices configured to couple to and communicate on a wired and/or wireless network (i.e., to perform network operations), including: control logic 916, an interface circuit 918 and a set of antennas 920 (or antenna elements) in an adaptive array that can be selectively turned on and/or off by control logic 916 to create a variety of optional antenna patterns or 'beam patterns.' (While FIG. 9 includes set of antennas 920, in some embodiments electronic device 900 includes one or more nodes, such as nodes 908, e.g., a pad, which can be coupled to set of antennas 920. Thus, electronic device 900 may or may not include set of antennas 920.) For example, networking subsystem 914 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices.

Within electronic device 900, processing subsystem 910, memory subsystem 912, and networking subsystem 914 are coupled together using bus 928 that facilitates data transfer between these components. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc. Display subsystem 926 may be controlled by processing subsystem 910 to display information to a user (e.g., information relating to incoming, outgoing, or an active communication session).

Electronic device 900 can also include a user-input subsystem 930 that allows a user of the electronic device 900 to interact with electronic device 900. For example, user-input subsystem 930 can take a variety of forms, such as: a button, keypad, dial, touch screen, audio input interface, visual/image capture input interface, input in the form of sensor data, etc.

Electronic device 900 can be (or can be included in) any electronic device with at least one network interface. For example, electronic device 900 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program module 922 is included in operating system 924 and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 914. This integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 922, operating system 924 (such as a driver for interface circuit 918) or in firmware in interface circuit 918. Alternatively or additionally, at least some of the operations in the communication technique may be implemented in a physical layer, such as hardware in interface circuit 918. In some embodiments, the communication technique is implemented, at least in part, in a MAC layer and/or in a physical layer in interface circuit 918. In particular, the communication technique may be implemented using lower-MAC firmware that is executed by interface circuit 918 and backoff counters that are implemented in hardware.

Furthermore, in general, the communication technique may be used to facilitate scheduled channel access in time and/or frequency in conjunction with multi-user multiple input multiple output (MU-MIMO) and/or Orthogonal Frequency Division Multiple Access (OFDMA).

In some embodiments, an access point includes one or more nodes configured to communicatively couple to an antenna; and an interface circuit, communicatively coupled to the one or more nodes, configured to communicate with a set of electronic devices in a wireless local area network (WLAN), and configured to: (i) receive, from the set of electronic devices, one or more buffer status reports that indicate that at least a subset of the set of electronic devices have uplink data, the uplink data having one or more associated access categories; (ii) create a group of uplink virtual queues for electronic devices in the subset based at least in part on the one or more buffer status reports, wherein a given uplink virtual queue corresponds to a particular access category for which there is pending uplink data at a given electronic device; (iii) start one or more backoff counters with a one-to-one correspondence to uplink virtual queues in the group of uplink virtual queues; and (iv) transmit, when a given backoff counter for the given uplink virtual queue reaches a predefined count value, a trigger frame to an electronic device in the subset that corresponds to the given uplink virtual queue.

In some embodiments, the trigger frame includes information specifying allocated resource units for the electronic device. In some embodiments, the predefined count value is zero. In some embodiments, the interface circuit is configured to receive a multi-user frame transmission from the electronic device in response to the trigger frame. In some embodiments, the access point is compatible with an Institute of Electrical and Electronics Engineers (IEEE) standard that includes trigger-based channel access. In some embodiments, the IEEE 802.11 standard includes IEEE 802.11ax. In some embodiments, a contention window used in the one or more backoff counters is the same as that used by one or more other access points in the WLAN that are compatible with an IEEE 802.11 standard that includes trigger-based channel access. In some embodiments, a contention window used in the one or more backoff counters is smaller than those used by the set of electronic devices or by one or more legacy access points in the WLAN that are not compatible with the IEEE 802.11 standard that includes trigger-based channel access. In some embodiments, a contention window used in the one or more backoff counters is based on a number of other access points in the WLAN that are compatible with an IEEE 802.11 standard that includes trigger-based channel access. In some embodiments, the contention window increases in duration as a number of other access points in the WLAN increases. In some embodiments, after the uplink data from the electronic device has been cleared, the interface circuit is configured to remove one or more corresponding uplink virtual queues in the group of uplink virtual queues. In some embodiments, the access point further includes the antenna. In some embodiments, the interface circuit is configured to remove the given uplink virtual queue after a time interval has elapsed since the given uplink virtual queue was created. In some embodiments, when the interface circuit initiates a cascaded operation in which a single backoff occurs at the beginning of the cascaded operation, followed by downlink, uplink and block acknowledgment operations, the interface circuit is configured to create a larger number of backoff counters for the access point in order to increase a channel-access priority of the access point to access a channel; and when any of the backoff counters reaches the predefined count value, the interface circuit is configured to access the channel. In some embodiments, during a target wake time (TWT) negotiation, the interface circuit is configured to provide a request that the electronic device disable transmissions during a subsequent TWT window. In some embodiments, during a common target wake time (TWT) negotiation for uplink and downlink traffic, the interface circuit is configured to receive, from the electronic device, a TWT request that the interface circuit disable transmissions by the access point during a subsequent TWT window.

In some embodiments, a non-transitory computer-readable storage medium stores instructions that, when executed by an interface circuit included in a communication device, cause the communication device to transmit a trigger frame, by carrying out one or more operations that include: (i) receiving, from a set of electronic devices in a wireless local area network (WLAN), one or more buffer status reports that indicate that at least a subset of the set of electronic devices have uplink data, the uplink data having one or more associated access categories; (ii) creating a group of uplink virtual queues for electronic devices in the subset based on the one or more buffer status reports, wherein a given uplink virtual queue corresponds to a particular access category for which there is pending uplink data at a given electronic device; (iii) starting one or more backoff counters with a one-to-one correspondence to uplink virtual queues in the group of uplink virtual queues; and (iv) when a given backoff counter for the given uplink virtual queue reaches a predefined count value, transmitting the trigger frame to an electronic device in the subset that corresponds to the given uplink virtual queue, where the communication device is compatible with an Institute of Electrical and Electronics Engineers (IEEE) standard that includes trigger-based channel access.

In some embodiments, the communication device includes an access point. In some embodiments, the trigger frame includes information specifying allocated resource units for the electronic device. In some embodiments, the one or more operations further include receiving a multi-user frame transmission from the electronic device in response to the trigger frame. In some embodiments, a contention window used in the one or more backoff counters is the same as that used by one or more other access points in the WLAN that are compatible with an IEEE 802.11 standard that includes trigger-based channel access. In some embodiments, a contention window used in the one or more backoff counters is smaller than those used by the set of electronic devices or one or more legacy access points in the WLAN that are not compatible with the IEEE 802.11 standard that includes trigger-based channel access. In some embodiments, a contention window used in the one or more backoff counters is based on a number of other access points in the WLAN that are compatible with an IEEE 802.11 standard that includes trigger-based channel access.

In some embodiments, a method for transmitting a trigger frame using an interface circuit in an access point includes: (i) receiving, from a set of electronic devices in a wireless local area network (WLAN), one or more buffer status reports that indicate that at least a subset of the set of electronic devices have uplink data, the uplink data having one or more associated access categories; (ii) creating a group of uplink virtual queues for electronic devices in the subset based on the one or more buffer status reports, wherein a given uplink virtual queue corresponds to a particular access category for which there is pending uplink data at a given electronic device; (iii) starting one or more backoff counters with a one-to-one correspondence to uplink virtual queues in the group of uplink virtual queues; and (iv) when a given backoff counter for the given uplink virtual queue reaches a predefined count value, transmitting the trigger frame to an electronic device in the subset that corresponds to the given uplink virtual queue.

In some embodiments, an access point includes: one or more nodes configured to communicatively couple to an antenna; and an interface circuit, communicatively coupled to the one or more nodes, configured to communicate with one or more electronic devices in a wireless local area network (WLAN), and configured to: (i) when the interface circuit initiates a cascaded operation in which a single backoff occurs at the beginning of the cascaded operation, followed by downlink, uplink and block acknowledgment operations, create a larger number of backoff counters for the access point in order to increase a channel-access priority of the access point to access a channel; and (ii) when any of the backoff counters reaches a predefined count value, access the channel.

In some embodiments, a non-transitory computer-readable storage medium stores instructions that, when executed by an interface circuit included in a communication device, cause the communication device to increase a channel-access priority, by carrying out one or more operations that include: (i) creating, when the interface circuit initiates a cascaded operation in which a single backoff occurs at the beginning of the cascaded operation, followed by downlink, uplink and block acknowledgment operations, multiple backoff counters associated with the access point in order to increase a channel-access priority of the access point; and (ii) accessing the channel when any of the multiple backoff counters reaches a predefined count value.

In some embodiments, a method for increasing a channel-access priority using an interface circuit in an access point includes: (i) when the interface circuit initiates a cascaded operation in which a single backoff occurs at the beginning of the cascaded operation, followed by downlink, uplink and block acknowledgment operations, creating a larger number of backoff counters for the access point in order to increase a channel-access priority of the access point to access a channel; and (ii) when any of the backoff counters reaches a predefined count value, accessing the channel.

In some embodiments, an access point includes one or more nodes configured to communicatively couple to an antenna; and an interface circuit, communicatively coupled to the one or more nodes, configured to communicate with one or more electronic devices in a wireless local area network (WLAN), and configured to: (i) during a target wake time (TWT) negotiation, provide a request that an electronic device disable transmissions during a subsequent TWT window; or (ii) during a common TWT negotiation for uplink and downlink traffic, receive, from the electronic device, a TWT request that the interface circuit disable transmissions by the access point during a subsequent TWT window.

In some embodiments, a non-transitory computer-readable storage medium stores instructions that, when executed by an interface circuit included in a communication device, cause the communication device to disable transmissions, by carrying out one or more operations that include: (i) during a target wake time (TWT) negotiation, providing a request that an electronic device disable transmissions during a subsequent TWT window; or (ii) during a common TWT negotiation for uplink and downlink traffic, receiving, from the electronic device, a TWT request that the interface circuit disable transmissions by the access point during the subsequent TWT window.

In some embodiments, a method for disabling transmissions using an interface circuit in an access point includes: (i) during a target wake time (TWT) negotiation, providing a request that an electronic device disable transmissions during a subsequent TWT window; or (ii) during a common TWT negotiation for uplink and downlink traffic, receiving, from the electronic device, a TWT request that the interface circuit disable transmissions by the access point during the subsequent TWT window.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
one or more nodes configured to communicatively couple to an antenna; and
an interface circuit, communicatively coupled to the one or more nodes, configured to communicate with a set of electronic devices in a wireless local area network (WLAN), and configured to:
receive, from the set of electronic devices, one or more buffer status reports that indicate that at least a subset of the set of electronic devices have uplink data, the uplink data having one or more associated access categories;
create a group of uplink virtual queues for electronic devices in the subset based at least in part on the one or more buffer status reports, wherein a given uplink virtual queue corresponds to a particular access category for which there is pending uplink data at a given electronic device;
start one or more backoff counters with a one-to-one correspondence to uplink virtual queues in the group of uplink virtual queues;
transmit, when a given backoff counter for the given uplink virtual queue reaches a predefined count value, a trigger frame to an electronic device in the subset that corresponds to the given uplink virtual queue; and
provide, to the electronic device during a target wake time (TWT) negotiation, a request that the electronic device disable transmissions during a subsequent TWT window.

2. The access point of claim 1, wherein the trigger frame includes information specifying allocated resource units for the electronic device.

3. The access point of claim 1, wherein the predefined count value is zero.

4. The access point of claim 1, wherein the interface circuit is configured to receive a multi-user frame transmission from the electronic device in response to the trigger frame.

5. The access point of claim 1, wherein the access point is compatible with an Institute of Electrical and Electronics Engineers (IEEE) standard that includes trigger-based channel access.

6. The access point of claim 5, wherein the IEEE standard comprises IEEE 802.11ax.

7. The access point of claim 1, wherein a contention window used in the one or more backoff counters is the same as that used by one or more other access points in the WLAN that are compatible with an IEEE 802.11 standard that includes trigger-based channel access.

8. The access point of claim 1, wherein a contention window used in the one or more backoff counters is smaller than those used by the set of electronic devices or by one or more legacy access points in the WLAN that are not compatible with an IEEE 802.11 standard that includes trigger-based channel access.

9. The access point of claim 1, wherein a contention window used in the one or more backoff counters is based on a number of other access points in the WLAN that are compatible with an IEEE 802.11 standard that includes trigger-based channel access.

10. The access point of claim 9, wherein the contention window increases in duration as a number of other access points in the WLAN increases.

11. The access point of claim 1, wherein, when the interface circuit initiates a cascaded operation in which a single backoff occurs at a beginning of the cascaded operation, followed by downlink, uplink and block acknowledgment operations, the interface circuit is configured to create a larger number of backoff counters for the access point in order to increase a channel-access priority of the access point to access a channel; and
wherein, when any of the one or more backoff counters reaches the predefined count value, the interface circuit is configured to access the channel.

12. The access point of claim 1, wherein, during a common target wake time (TWT) negotiation for uplink and downlink traffic, the interface circuit is configured to receive, from the electronic device, a TWT request that the interface circuit disable transmissions by the access point during a subsequent TWT window.

13. The access point of claim 1, wherein the interface is configured to remove the given uplink virtual queue after the pending uplink data for the given uplink virtual queue has cleared or after a time interval has elapsed since the given uplink virtual queue was created.

14. A non-transitory computer-readable storage medium storing instructions that, when executed by an interface circuit included in a communication device, cause the communication device to transmit a trigger frame, by carrying out one or more operations that comprise:
receiving, from a set of electronic devices in a wireless local area network (WLAN), one or more buffer status reports that indicate that at least a subset of the set of electronic devices have uplink data, the uplink data having one or more associated access categories;
creating a group of uplink virtual queues for electronic devices in the subset based on the one or more buffer status reports, wherein a given uplink virtual queue corresponds to a particular access category for which there is pending uplink data at a given electronic device;
starting one or more backoff counters with a one-to-one correspondence to uplink virtual queues in the group of uplink virtual queues;
when a given backoff counter for the given uplink virtual queue reaches a predefined count value, transmitting the trigger frame to an electronic device in the subset that corresponds to the given uplink virtual queue, wherein the communication device is compatible with an Institute of Electrical and Electronics Engineers (IEEE) standard that includes trigger-based channel access; and
providing, to the electronic device during a target wake time (TWT) negotiation, a request that the electronic device disable transmissions during a subsequent TWT window.

15. The non-transitory computer-readable storage medium of claim 14, wherein a contention window used in the one or more backoff counters is the same as that used by one or more other access points in the WLAN that are compatible with an IEEE 802.11 standard that includes trigger-based channel access.

16. The non-transitory computer-readable storage medium of claim 14, wherein a contention window used in the one or more backoff counters is smaller than those used by the set of electronic devices or one or more legacy access points in the WLAN that are not compatible with an IEEE 802.11 standard that includes trigger-based channel access.

17. The non-transitory computer-readable storage medium of claim 14, wherein a contention window used in the one or more backoff counters is based on a number of other access points in the WLAN that are compatible with an IEEE 802.11 standard that includes trigger-based channel access.

18. The non-transitory computer-readable storage medium of claim 14, wherein the trigger frame includes information specifying allocated resource units for the electronic device.

19. The non-transitory computer-readable storage medium of claim 14, wherein the IEEE standard comprises IEEE 802.11ax.

20. A method for increasing a channel-access priority, the method comprising:
 using an interface circuit in an access point:
  creating, when the interface circuit initiates a cascaded operation in which a single backoff occurs at a beginning of the cascaded operation, followed by downlink, uplink and block acknowledgment operations, multiple backoff counters associated with the access point in order to increase the channel-access priority of the access point; and
  accessing the channel when any of the multiple backoff counters reaches a predefined count value.

* * * * *